(12) United States Patent
Aoyama

(10) Patent No.: US 7,356,254 B2
(45) Date of Patent: Apr. 8, 2008

(54) IMAGE PROCESSING METHOD, APPARATUS, AND PROGRAM

(75) Inventor: Tatsuya Aoyama, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 332 days.

(21) Appl. No.: 11/107,923

(22) Filed: Apr. 18, 2005

(65) Prior Publication Data
US 2005/0243351 A1 Nov. 3, 2005

(30) Foreign Application Priority Data
Apr. 19, 2004 (JP) ............... 2004-122530

(51) Int. Cl.
G03B 13/20 (2006.01)
(52) U.S. Cl. ............... 396/147; 348/346; 348/333.11; 358/453; 382/255
(58) Field of Classification Search ............... 396/287, 396/374, 147; 348/333.11, 333.12, 346; 382/255; 358/453, 527
See application file for complete search history.

(56) References Cited

U.S. PATENT DOCUMENTS

| | | | | |
|---|---|---|---|---|
| 2003/0117511 A1* | 6/2003 | Belz et al. | ............. | 348/333.11 |
| 2003/0184667 A1 | 10/2003 | Aoyama | ............. | 348/333.12 |
| 2004/0246360 A1* | 12/2004 | Stavely et al. | ......... | 348/333.11 |
| 2005/0046730 A1* | 3/2005 | Li | ............. | 348/333.12 |
| 2005/0134719 A1* | 6/2005 | Beck | ............. | 348/333.11 |
| 2005/0219367 A1* | 10/2005 | Kanda et al. | ............ | 348/207.2 |
| 2005/0243350 A1* | 11/2005 | Aoyama | ............. | 358/1.9 |

* cited by examiner

Primary Examiner—W. B. Perkey
(74) Attorney, Agent, or Firm—Birch, Stewart, Kolasch & Birch, LLP

(57) ABSTRACT

An image of a region in which a blur tends to clearly appear is extracted from a digital photograph image as a blur checking regional image. Then, the extracted blur checking regional image is displayed in a size appropriate for the resolution of a display device.

15 Claims, 7 Drawing Sheets

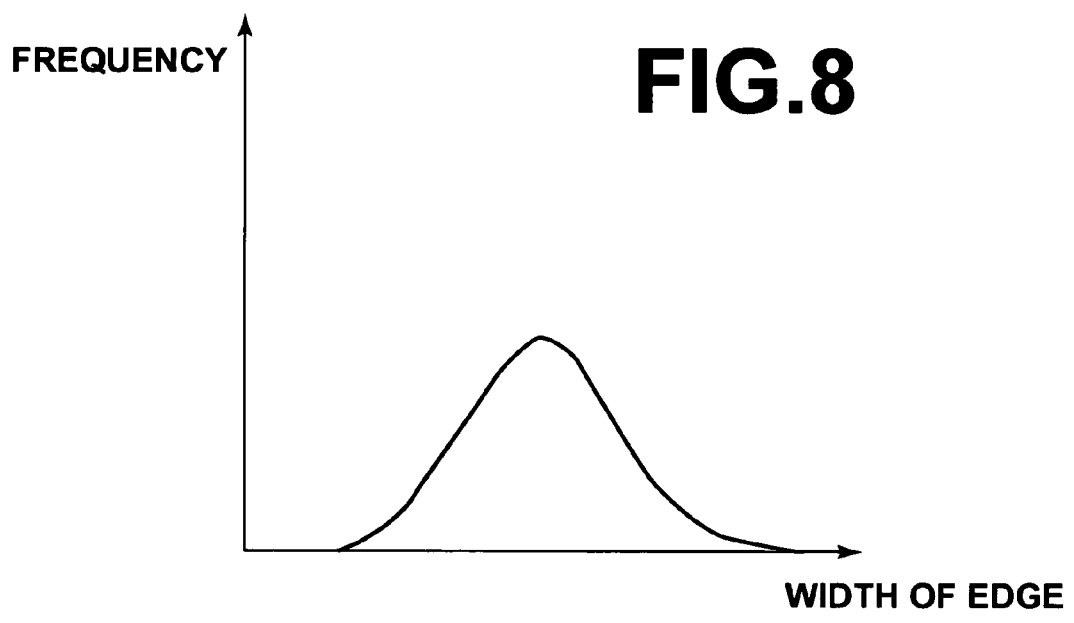
HISTOGRAM OF WIDTHS OF EDGES

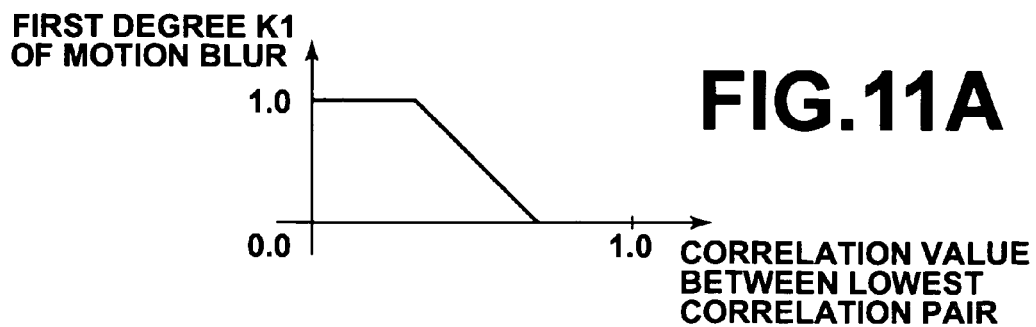
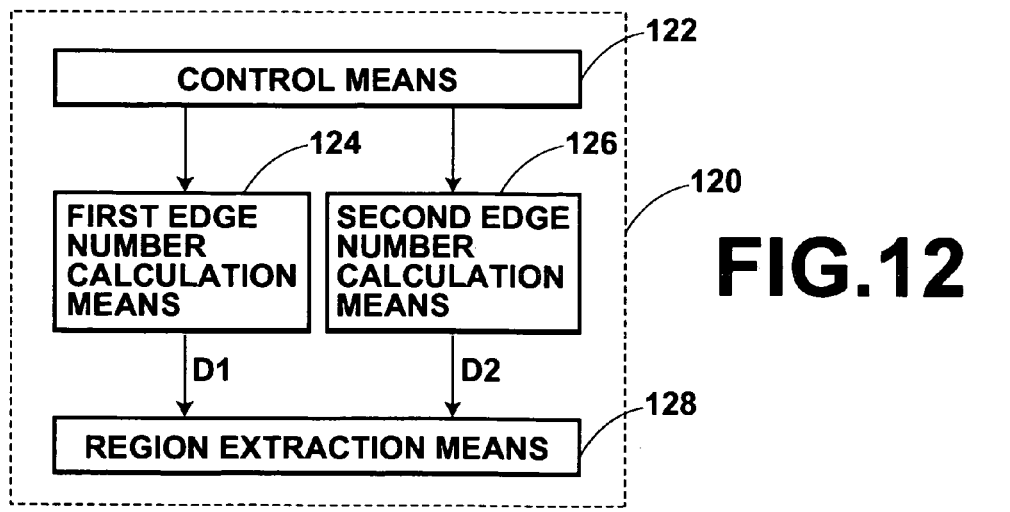

IMAGE PROCESSING METHOD, APPARATUS, AND PROGRAM

BACKGROUND OF THE INVENTION

1. Field of the Invention

The present invention relates to image processing. Particularly, the present invention relates to an image processing method, apparatus, and program for making users check the condition of blurs in digital photograph images.

2. Description of the Related Art

Digital photograph images (hereinafter, referred to as photograph images or images, for short) are obtained by photoelectrically reading out photograph images recorded on photograph films such as negative films and color reversible films with a readout device such as a scanner. Digital photograph images are also obtained by photographing subjects with digital still cameras (DSC). When the digital photograph images are obtained, blurs are present in some of the digital photograph images. When photograph images are obtained by photographing a subject, the images may become fuzzy because of an out-of-focus blur or a blur due to hand motion of a photographer. The out-of-focus blur is created when focal length is not adjusted appropriately, whereas the blur due to hand motion is created when a camera is moved because of the motion of the hands of the photographer (hereinafter referred to as a motion blur, for short). If a blur is an out-of-focus blur, a point image spreads two-dimensionally. In other words, the out-of-focus blur spreads non-directionally in the photograph image. However, if the blur is a motion blur, the point image traces a certain locus, and the point image spreads linearly in the image. In other words, the motion blur spreads directionally in the photograph image.

As cellular phones rapidly became popular in recent years, the performance of the cellular phones has improved. Especially, an improvement in the performance of digital cameras (hereinafter referred to as cellular cameras, for short) attached to the cellular phones is remarkable. Recently, the number of pixels of the cellular cameras exceeded one million. Therefore, the cellular cameras are used in a similar manner to ordinary digital cameras. When people travel with their friends, they often use their cellular cameras to take their photographs. Further, many users of the cellular phones take photographs of their favorite TV stars or athletes with their cellular cameras. Under these circumstances, many users of the cellular phones who enjoy the photographs obtained with their cellular cameras by displaying them on the monitors of their cellular phones also print the photographs in a similar manner to printing of those obtained with ordinary digital cameras.

However, since the main bodies (cellular phones) of the cellular cameras are not ergonomically designed as specialized photography apparatuses, there is a problem that it is not easy to hold the cellular phones during photography. Further, since no strobes are provided in the cellular cameras, the shutter speeds of the cellular cameras are slower than those of the ordinary digital cameras. Therefore, when a photograph of a subject is taken with a cellular camera, a possibility that a motion blur is created in the obtained image is high in comparison with photography with ordinary cameras. Since the monitor of the cellular phone is small, when an image obtained by photography with a cellular camera is displayed on the monitor to check the image, the size of the image is reduced. Therefore, if a large motion blur is present in the image, the photographer can detect the motion blur in the monitor. However, if a small out-of-focus blur or motion blur is present in the image, he/she often notices the blur only after the image is printed. Therefore, various methods have been proposed to correctly check the condition of a blur in a image by displaying it on a small monitor such as monitors of the cellular phones.

For example, among digital cameras which are on sale, there are digital cameras in which the condition of blurs can be more easily checked by making the users of the digital cameras specify display regions in images obtained by photography. In these digital cameras, the users display the images of the specified display regions on the monitors of the digital cameras at a 1:1 magnification ratio or by enlarging them.

Alternatively, as disclosed in U.S. Patent Application Publication No. 20030184667, a method for extracting an image of a predetermined region such as the central region of the image, and displaying it at a 1:1 magnification ratio has been proposed. Further, a method for dividing the image into a plurality of regions and sequentially displaying them at a 1:1 magnification ratio has been proposed.

However, in the method of making users specify display regions, the users are required to specify the regions which will be checked, and that is troublesome for the users. Further, in the method of making the users specify display regions, the users cannot always accurately specify the regions which are appropriate for checking blurs. Therefore, even if an image is a blurred image, the users may erroneously judge that the image is an image without a blur.

Further, in a method of displaying a region at a predetermined position of an image by extracting it from the image, as disclosed in U.S. Patent Application Publication No. 20030184667, there is a problem that if the region at the predetermined position of the image is not appropriate for checking blurs, the users cannot accurately judge the condition of the blurs. Further, in the method of dividing an image into a plurality of regions and sequentially displaying the divided regions, there is a problem that a long time is required for processing, and that is troublesome for the users.

SUMMARY OF THE INVENTION

In view of the foregoing circumstances, it is an object of the present invention to provide an image processing method, apparatus, and program for efficiently check the condition of blurs of digital photograph images.

An image processing method according to the present invention is an image processing method comprising the steps of:

extracting an image of a region in which a blur tends to clearly appear from a digital photograph image as a blur checking regional image; and displaying the extracted blur checking regional image in a size appropriate for the resolution of a display device.

In the present invention, the "digital photograph image" may be a digital image obtained by photographing a subject with a digital camera or like. Alternatively, the "digital photograph image" may be a digital image obtained by reading out an image on a silver-halide film, printed matter (for example, a print), or the like with a read-out device such as a scanner. Hereinafter, for the purpose of simplifying descriptions, the term "image" is used to represent the digital photograph image.

Although blurs are evenly distributed in the entire region of an image, there are regions in which the blurs can be easily detected, and there are also regions in which the blurs cannot be easily detected, or cannot be detected at all. For example, when an image is divided into regions as illustrated by dotted lines in FIG. 3, if only a block in the upper left corner of the image is observed, it is impossible to judge whether the image is blurred. However, a blur is clearly distinguishable if a block including the hair region of a subject (a person in the example illustrated in FIG. 3), or contours such the ears of the subject or the like is observed. In the present invention, a region in which a blur is clearly distinguishable, as described above, is extracted as a "region in which a blur clearly appears", and the extracted region is displayed in a size appropriate for the resolution of a display device.

As described above, when a blur is created in an image, a point image in the image spreads. Therefore, in a blurred image, edges spread as the point image spreads. Specifically, the shapes of the edges in the image are directly related to the blurs. Therefore, if more edges are present in the region, the blurs in the image of the region tend to appear more clearly. In the image processing method according to the present invention, this characteristic is utilized. In the image processing method according to the present invention, when a blur checking regional image is extracted from the digital photograph image, it is preferable that edges are extracted from the digital photograph image, and the number of the extracted edges is obtained for each of a plurality of regional images having the same size, which are formed by dividing the digital photograph image into blocks. It is preferable that a regional image which has a largest number of the edges is extracted as the blur checking regional image.

Further, the width of a blur may be used as a parameter for representing the degree of the blur (an out-of-focus blur or a motion blur) in a digital photograph image. The width of the blur is the degree of spread of an edge in other words. Therefore, if the width of a blur in a digital photograph image is detected, it may be judged that the blur tends to clearly appear in an image of a region in which many edges having the widths wider than or equal to the width of the blur are present. Therefore, this characteristic is utilized in the image processing method according to the present invention. In the image processing method, it is more preferable that edges are extracted from an image, and the width of a blur in the image is calculated. It is preferable that the number of edges of which the widths are wider than or equal to that of the blur is calculated for each of a plurality of regional images having the same size, which are formed by dividing the digital photograph image into blocks. It is preferable that a regional image which has a largest number of the edges is extracted as the blur checking regional image.

Further, in the image processing method according to the present invention, it is preferable that the size of the regional image is determined based on the resolution of the display device.

The image processing apparatus according to the present invention is an image processing apparatus comprising:

a blur checking regional image extraction means for extracting an image of a region in which a blur tends to clearly appear from a digital photograph image as a blur checking regional image; and a display means for displaying the extracted blur checking regional image in a size appropriate for the resolution of a display device.

In the image processing method according to the present invention, it is preferable that the blur checking regional image extraction means includes an edge extraction means for extracting edges from the digital photograph image, an edge number calculation means for obtaining the number of the extracted edges for each of a plurality of regional images having the same size, which are formed by dividing the digital photograph image into blocks, and an extraction means for extracting a regional image which has a largest number of the edges as the blur checking regional image.

In the image processing method according to the present invention, it is preferable that the blur checking regional image extraction means includes an edge extraction means for extracting edges from the digital photograph image, a blur width calculation means for obtaining the width of a blur in the digital photograph image, an edge number calculation means for obtaining the number of edges which have the width wider than or equal to that of the blur for each of a plurality of regional images having the same size, which are formed by dividing the digital photograph image into blocks, and an extraction means for extracting a regional image which has a largest number of the edges as the blur checking regional image.

Further, it is preferable that the size of the regional image is determined based on the resolution of the display device.

The image processing method according to the present invention may be provided as a program for causing a computer to execute the image processing method.

In the image processing method and apparatus according to the present invention, an image of a region in which a blur tends to clearly appear is extracted as a blur checking regional image from a digital photograph image, and the extracted image is displayed in a size appropriate for the resolution of a display device. Therefore, the users can check the condition of blurs in the image without specifying a region of the image. Further, the users can check the condition of the blurs without sequentially displaying a plurality of regions of the image by dividing the image into the plurality of regions. Therefore, image processing can be performed efficiently. Further, since the image of the region in which blurs tend to clearly appear is extracted, it is possible to prevent the users from erroneously judging a blurred image as an image without an blur.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 8 is a histogram of the widths of edges;

FIG. 11A is a diagram for explaining calculation of the degree of a blur;

FIG. 11B is a diagram for explaining calculation of the degree of a blur;

FIG. 11C is a diagram for explaining calculation of the degree of a blur; and

FIG. 12 is a block diagram illustrating the configuration of a checking image extraction means 120 in the image processing apparatus illustrated in FIG. 4.

DESCRIPTION OF THE PREFERRED EMBODIMENTS

Hereinafter, embodiments of the present invention will be described with reference to the attached drawings.

Figure 1:
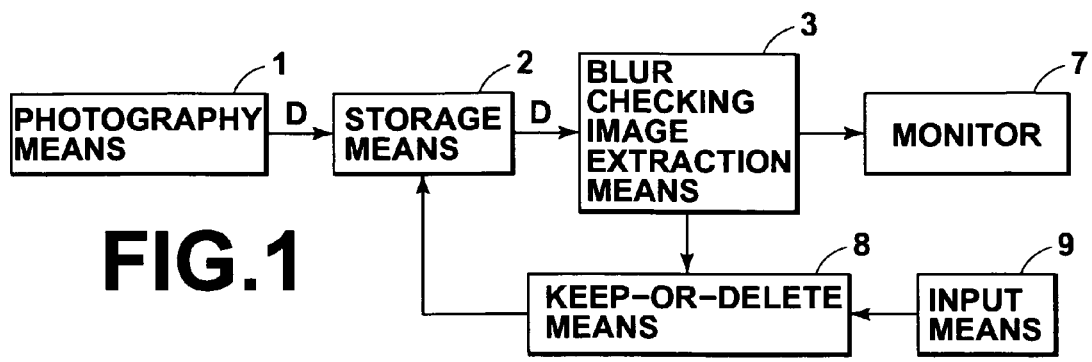
FIG. 1 is a block diagram illustrating the configuration of a digital camera in a first embodiment of the present invention.

FIG. 1 is a block diagram illustrating the configuration of a digital camera in a first embodiment of the present invention.

As illustrated in FIG. 1, the digital camera in the first embodiment of the present invention includes a photography means 1 for obtaining an image D by photographing a subject. The digital camera also includes a storage means 2 for storing the image D obtained by the photography means 1. The digital camera also includes a blur checking image extraction means 3. The blur checking image extraction means 3 extracts a blur checking image for checking the condition of a blur in the image D from the image D stored in the storage means 2. The blur checking image extraction means 3 also displays the extracted blur checking image on a monitor 7 which will be described later. The digital camera also includes the monitor 7 for displaying the blur checking image obtained by the blur checking image extraction means 3. The digital camera also includes an input means 9. A user of the digital camera inputs an instruction as to whether the original image D of the blur checking image displayed on the monitor 7 should be stored or deleted at the input means 9. The digital camera also includes a keep-or-delete means 8 which stores or deletes the image D based on the input by the user at the input means 9. In the present embodiment, it is assumed that the monitor 7 has a resolution of QVGA (Quarter Video Graphics Array), namely 320 pixels×240 pixels, for example.

Figure 2:
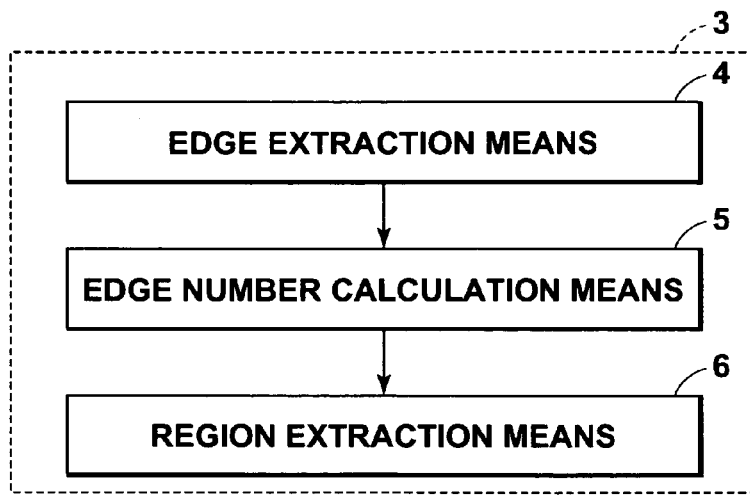
FIG. 2 is a block diagram illustrating the configuration of a blur checking image extraction means 3 in the digital camera illustrated in FIG. 1.

FIG. 2 is a block diagram illustrating the configuration of the blur checking image extraction means 3 in the digital camera illustrated in FIG. 1. As illustrated in FIG. 2, the blur checking image extraction means 3 includes an edge extraction means 4 for extracting edges from the image D. The blur checking image extraction means 3 also includes an edge number calculation means 5. The edge number calculation means 5 calculates the number of edges extracted by the edge extraction means 4 for each region having a size (320 pixels×240 pixels in this case) which is appropriate for the resolution of the monitor 7. The checking image extraction means 3 also includes a region extraction means 6. The region extraction means 6 extracts an image of a region which has a largest number of edges based on the number of edges in each region, obtained by the edge number calculation means 5, as a blur checking image. Then, the region extraction means 6 outputs the extracted image to the monitor 7.

The monitor 7 displays the blur checking image obtained by the blur checking image extraction means 3. The blur checking image displayed on the monitor 7 is an image of a region which has the largest number of edges in the image D as described above. Further, the blur checking image is displayed on the monitor 7 at 1:1 magnification ratio. In other words, the blur checking image is not a reduced image. Therefore, the users can accurately check the condition of the blurs in the image D even if the size of the monitor is small such as QVGA.

The users can input instructions at the input means 9 while looking at the blur checking image displayed on the monitor 7. They can input instructions such as deletion of an image which includes an extremely large blur or storage of the image D in which a blur is not present or in which a blur only in an allowable range is present. Then, the keep-or-delete means 8 performs processing based on the instructions input by the users at the input means 9. The keep-or-delete means 8 performs processing for deleting the image D from the storage means 2 or processing for keeping the image D stored.

Figure 3:
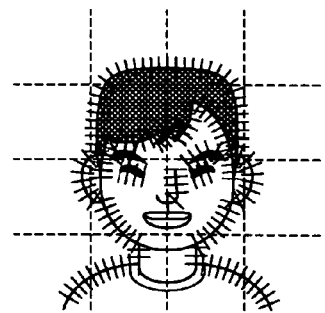
FIG. 3 is a diagram illustrating an example of edge distribution in an image.

As described above, in the digital camera according the present embodiment, an image of a region in which the number of edges is small is not extracted as the blur checking image. The region in which the number of edges is small is a region, such as a block at the end of the image and a block of a flat region of a face in the image illustrated in FIG. 3, in which a blur does not tend to clearly appear even if a blur is present in the region. However, an image of a region in which edges are concentrated, such as a hair region and a region including ears is extracted as the blur checking image, and displayed at a 1:1 magnification ratio. Therefore, the users can efficiently check the condition of the blur.

Figure 4:
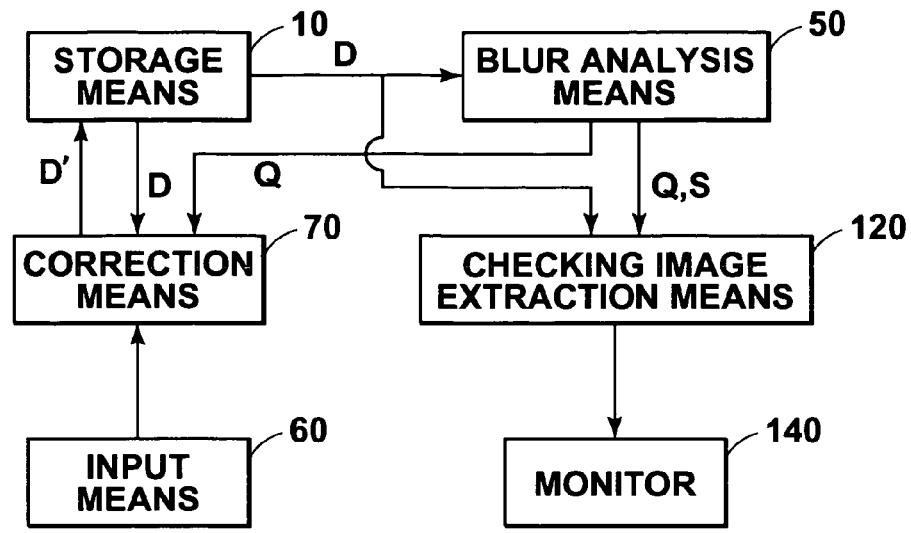
FIG. 4 is a block diagram illustrating the configuration of an image processing apparatus in a second embodiment of the present invention.

FIG. 4 is a block diagram illustrating the configuration of an image processing apparatus according to a second embodiment of the present invention. The image processing apparatus in the present embodiment performs processing for correcting blurs in an image. The image processing apparatus in the present embodiment may be provided as a part of a photography apparatus such as a digital camera. Alternatively, the image processing apparatus may be provided separately from the photography apparatus. In that case, the image processing apparatus may be provided as a part of an apparatus which performs image processing including blur correction processing on an input image.

As illustrated in FIG. 4, the image processing apparatus in the present embodiment includes a storage means 10 for storing a digital photograph image D. The image processing apparatus also includes a blur analysis means 50 for analyzing the condition of blurs in the image D stored in the storage means 10. The image processing apparatus also includes a checking image extraction means 120 for extracting a regional image which is a part of the image D from the image D to check the blurs. The checking image extraction means 120 also enlarges the extracted image to a size appropriate for the resolution of a monitor 140 which will be described later. The image processing apparatus also includes the monitor 140 for displaying the checking image obtained by the checking image extraction means 120. The image processing apparatus also includes an input means 60 at which the users input instructions. The users input instructions such as storing or deleting the original image D corresponding to the checking image displayed on the monitor 140, or performing blur correction processing on the image D. The image processing apparatus also includes a correction means 70 for performing storage, deletion, or correction on the image D based on the instructions input by the users at the input means 60.

Figure 5:
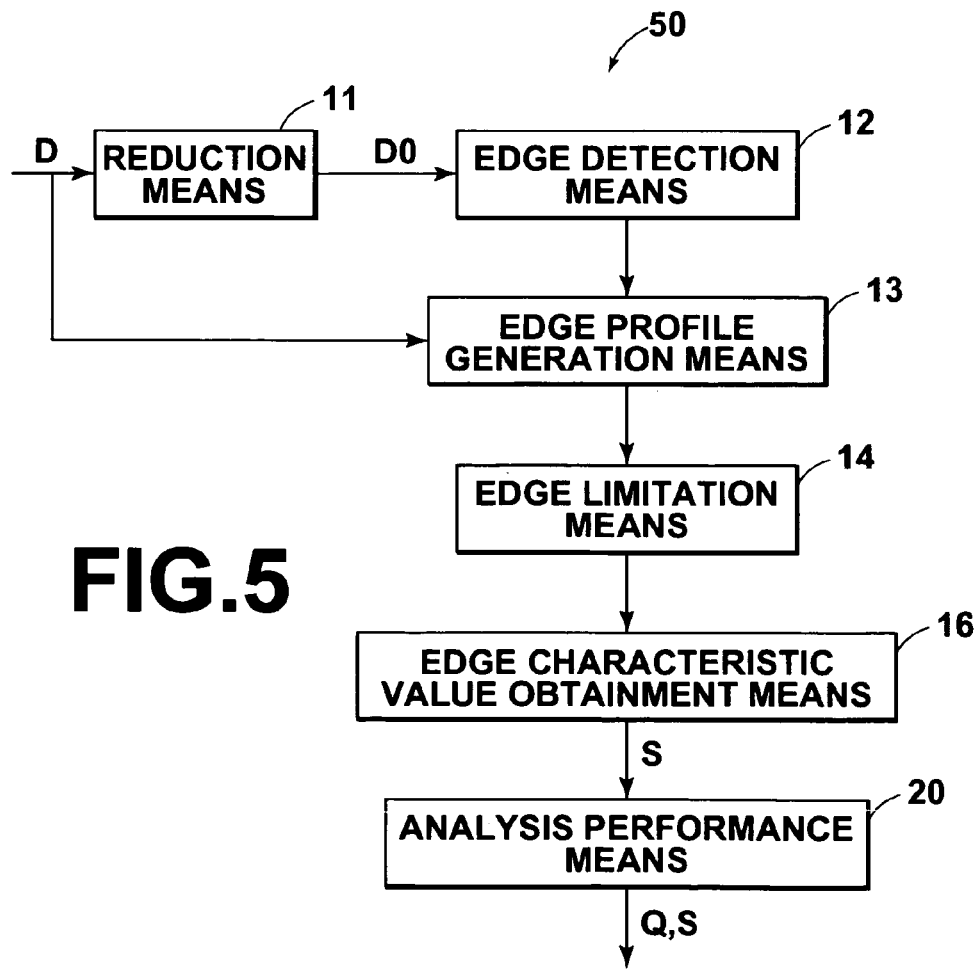
FIG. 5 is a block diagram illustrating the configuration of a blur analysis means 50 in the image processing apparatus illustrated in FIG. 4.
Figure 6:
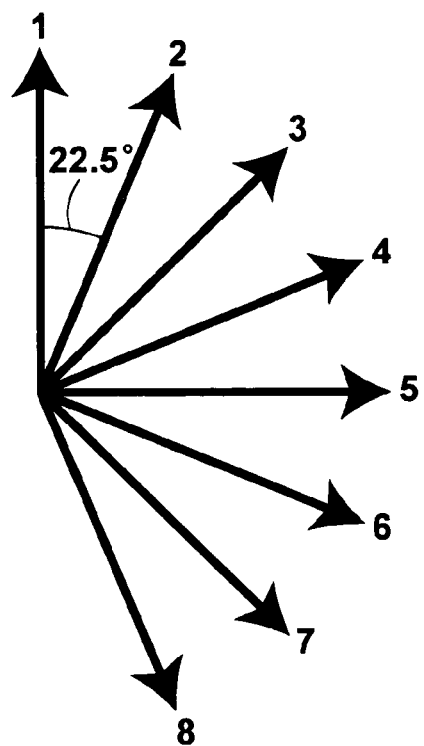
FIG. 6 is a diagram illustrating directions of edge detection processing.

FIG. 5 is a block diagram illustrating the configuration of the blur analysis means 50 in the image processing apparatus illustrated in FIG. 4. As illustrated in FIG. 5, the blur analysis means 50 includes a reduction means 11 for obtaining a reduced image D0 of the image D by performing reduction processing on the image D. The blur analysis means 50 also includes an edge detection means 12 for detecting an edge for each of eight directions as illustrated in FIG. 6, which are different from each other. The blur analysis means 50 also includes an edge profile generation means 13 for generating the profile of the edge detected by the edge detection means 12. The blur analysis means 50 also includes an edge limitation means 14 for removing invalid edges. The blur analysis means 50 also includes an edge characteristic value obtainment means 16 for obtaining the characteristic value S of the edge obtained by the edge limitation means 14. The blur analysis means 50 also includes an analysis performance means 20. The analysis performance means 20 calculates the direction of the blur in the image D, the degree N of the blur in the image D, the degree K of a motion blur in the image D, and the width L of the blur in the image D using the characteristic value S of the edge. Then, the analysis performance means 20 outputs the calculated data as blur information Q to the correction means 70 and the checking image extraction means 120.

The reduction means 11 reduces the image D at a reduction ratio of ⅛, for example, to obtain a reduced image D0. Then, the reduction means 11 outputs the reduced image D0 to the edge detection means 12.

The edge detection means 12 detects an edge of which the intensity is higher than or equal to a predetermined value in each of eight directions illustrated in FIG. 6 using the reduced image D0. Then, the edge detection means 12 obtains coordinate positions of the edges, and outputs them to the edge profile generation means 13.

Figure 7:
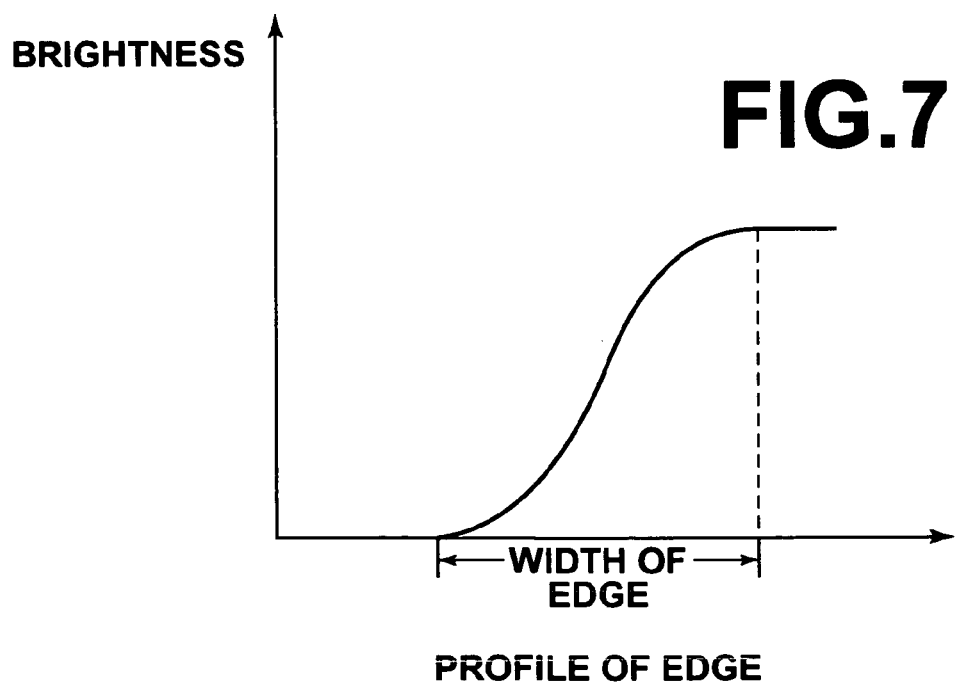
FIG. 7 is a diagram illustrating the profile of an edge.

The edge profile generation means 13 generates the profiles of these edges, as illustrated in FIG. 7, using the image D. The edge profile generation means 13 generates the profile of the edge based on the coordinate position of each edge in each direction, detected by the edge detection means 12. Then, the edge profile generation means 13 outputs the profile of the edge to the edge limitation means 14.

The edge limitation means 14 removes invalid edges based on the profiles of the edges output from the edge detection means 12. The invalid edges are edges having complicated profile shapes, and edges including light sources (for example, edges of which the brightness is higher than or equal to a predetermined value), or the like. The edge limitation means 14 outputs the profiles of the remaining edges to the edge characteristic value obtainment means 16.

The edge characteristic value obtainment means 16 obtains the width of each edge as illustrated in FIG. 7 based on the profile of the edge, output by the edge limitation means 14. Then, the edge characteristic value obtainment means 16 generates a histogram of the widths of the edges as illustrated in FIG. 8 for each of the eight directions illustrated in FIG. 6. Then, the edge characteristic value obtainment means 16 outputs the histograms and the widths of the edges to the analysis performance means 20 as the characteristic values S of the edges.

The analysis performance means 20 mainly performs the following two kinds of processing:

1. Obtainment of the direction of a blur in the image D and the degree of the blur in the image D; and 2. Calculation of the width L of the blur in the image D and the degree K of a motion blur in the image D.

First, the first processing will be described.

Figure 9A:
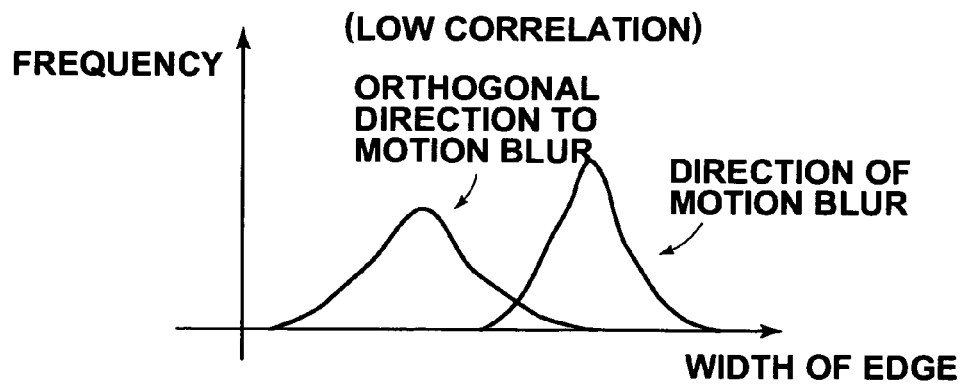
FIG. 9A is a diagram for explaining the operation of an analysis performance means 20 in the blur analysis means 50 illustrated in FIG. 5.
Figure 9B:
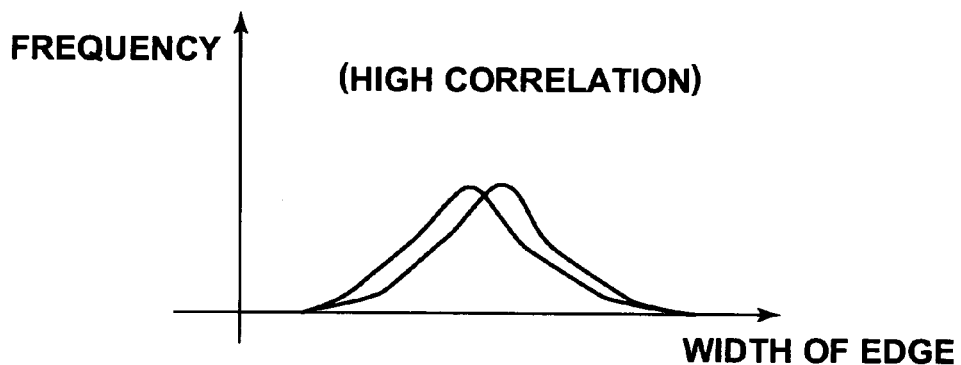
FIG. 9B is a diagram for explaining the operation of the analysis performance means 20 in the blur analysis means 50 illustrated in FIG. 5.
Figure 9C:
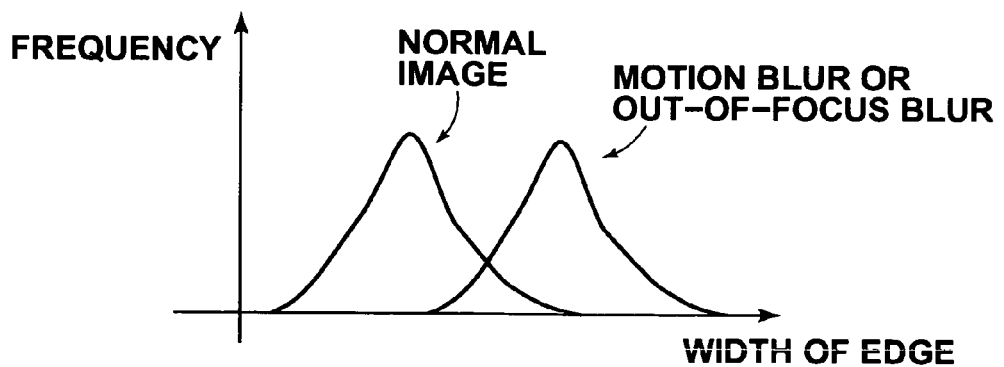
FIG. 9C is a diagram for explaining the operation of the analysis performance means 20 in the blur analysis means 50 illustrated in FIG. 5.

The analysis performance means 20 obtains a correlation value between a pair of histograms of the widths of the edges (hereinafter referred to as histograms for short) to obtain the direction of a blur in the image D. The pair of histograms is a pair of histograms for two directions (1-5, 2-6, 3-7, and 4-8) which are orthogonal to each other among the eight directions, illustrated in FIG. 6. There are many kinds of correlation values depending on the methods for obtaining the correlation values. However, there are mainly two kinds of correlation values. In one kind of correlation values, if the correlation values are high, the correlation is low. In the other kind of correlation values, the correlation value is proportional to the correlation. In other words, if the correlation value is small, the correlation is low. In the present embodiment, a correlation value of which the value is proportional to an actual correlation is used, for example. As illustrated in FIGS. 9A, 9B, and 9C, when a motion blur is present in an image, a correlation between a histogram for the direction of the motion blur and a histogram for the direction orthogonal to the direction of the motion blur is low (please refer to FIG. 9A). However, if the pair of histograms is a pair of histograms for mutually orthogonal directions which are different from the direction of the motion blur, or if a motion blur is not present in the image (no blur is present, or even if a blur is present, the blur is an out-of-focus blur), a correlation between the histograms is high (please refer to FIG. 9B). Therefore, in the analysis performance means 20 of the image processing apparatus in the present embodiment, the characteristic of the correlation values as described above is utilized. The analysis performance means 20 obtains a correlation value between each pair of histograms regarding four pairs of directions. Then, the analysis performance means 20 finds a pair of directions in which the correlation is the lowest among the four pairs. If a motion blur is present in the image D, one of the pair of directions may be judged as a direction closest to the direction of the motion blur among the eight directions illustrated in FIG. 6.

FIG. 9C is a histogram of the widths of edges in the direction of the motion blur. Here, the same subject is photographed under different photography conditions, and an image with a motion blur, an image with an out-of-focus blur, and an image without a blur (an out-of focus blur and a motion blur) are obtained. The widths of the edges in the direction of the motion blur are obtained for each of the images. As illustrated in FIG. 9C, a normal image without a blur has the lowest average edge width. Therefore, in the pair of directions, which was found as described above, a direction which has the largest average edge width should be a direction closest to the direction of the motion blur.

Accordingly, the analysis performance means 20 finds the pair of directions between which the correlation is the lowest, and judges that a direction which has the larger average edge width between the two directions in the pair is the direction of the blur.

Figure 10:
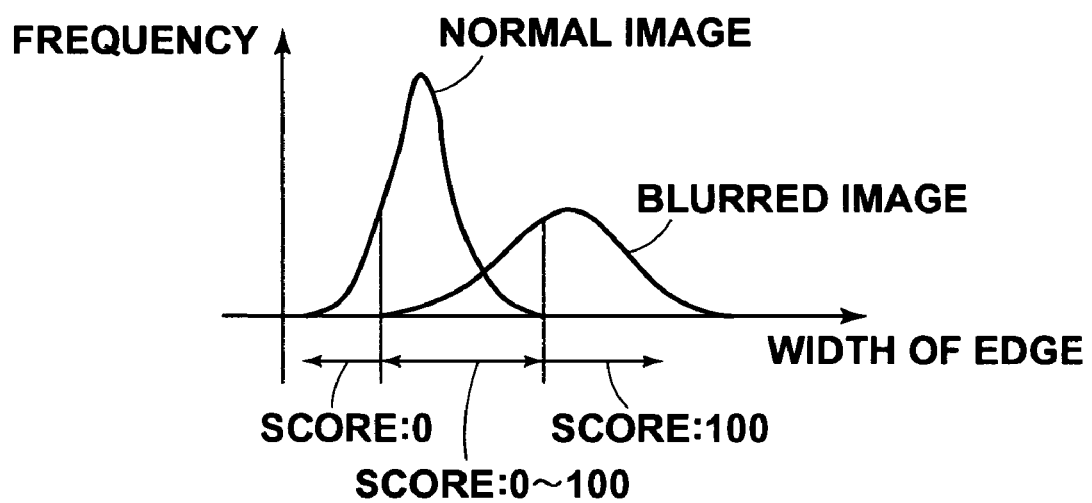
FIG. 10 is a diagram for explaining calculation of the degree of a blur.

Next, the analysis performance means 20 obtains the degree of a blur in the image D. The degree of the blur in the image represents how much the image is blurred. For example, the degree of the blur may be obtained by using the average edge width in the direction of the largest blur (in this case, the direction of the blur obtained as described above) in the image. However, here, the degree of the blur is obtained more accurately using a database based on FIG. 10, which is generated using the width of each edge in the direction of the blur. FIG. 10 is a histogram showing the distribution of the widths of edges in the direction of the largest blur in the image (if the image is a normal image, it is preferable that the direction is a direction corresponding to the direction of the largest blur. However, the direction may be an arbitrary direction). The histogram as illustrated in FIG. 10 is generated based on an image database of normal images for learning and an image database of blurred images (including out-of-focus blurs or motion blurs). Then, a ratio between a frequency (illustrated in the vertical axis) in a blurred image and a frequency (illustrated in the vertical axis) in a normal image is obtained as an evaluation value (a score in FIG. 10) for each of the widths of the edges. Then, a database (hereinafter referred to as a score database) showing a correspondence between the widths of edges and the scores is created based on FIG. 10, and the database is stored in a storage means, which is not illustrated.

The analysis performance means 20 refers to the score database, which was created based on FIG. 10, and stored in a storage means, which is not illustrated. Then, the analysis performance means 20 obtains a score based on the width of each edge in the direction of the blur in the image D. Then, the analysis performance means 20 obtains an average value of the scores of all of the edges in the direction of the blur as the degree N of the blur in the image D.

The second processing by the analysis performance means 20 will be described. First, the analysis performance means 20 obtains the degree K of a motion blur in the image D.

The degree K of the motion blur, which represents how much an image is blurred because of motion, can be obtained based on the following elements.

1. A correlation value between a pair of directions which have the lowest correlation (hereinafter referred to as a lowest correlation pair): If the correlation value is lower, the degree of the motion blur is higher.

This characteristic is utilized, and the analysis performance means 20 obtains a first degree K1 of a motion blur based on a curve illustrated in FIG. 11A. An LUT (lookup table) created based on the curve illustrated in FIG. 11A is stored in a storage means which is not illustrated. The analysis performance means 20 obtains the first degree K1 of the motion blur by reading it from the storage means which is not illustrated. The first degree K1 of the motion blur is a value corresponding to the correlation value of the lowest correlation pair.

2. An average edge width in a direction in which the average edge width is the larger between the two directions of the lowest correlation pair: If the average edge width is larger, the degree of the motion blur is higher.

This characteristic is utilized, and the analysis performance means 20 obtains a second degree K2 of a motion blur based on a curve illustrated in FIG. 11B. An LUT (lookup table) created based on the curve illustrated in FIG. 11B is stored in a storage means which is not illustrated. The analysis performance means 20 obtains the second degree K2 of a motion blur by reading it from the storage means which is not illustrated. The second degree K2 of the motion blur is a value which corresponds to the average edge width in a direction in which the average edge width is the larger between the lowest correlation pair.

3. A difference in the average edge width between two directions of the lowest correlation pair: If the difference is larger, the degree of a motion blur is higher.

This characteristic is utilized, and the analysis performance means 20 obtains a third degree K3 of a motion blur based on a curve illustrated in FIG. 1C. An LUT (lookup table) created based on the curve illustrated in FIG. 11C is stored in the storage means which is not illustrated. The analysis performance means 20 obtains the third degree K3 of the motion blur by reading it from the storage means which is not illustrated. The third degree K3 of the motion blur corresponds to a difference in the average edge width between the two directions of the lowest correlation pair.

The analysis performance means 20 obtains the first degree K1 of the motion blur, the second degree K2 of the motion blur, and the third degree K3 of the motion blur, as described above. The analysis performance means 20 also obtains the degree K of the motion blur in the blurred image D using the degrees K1, K2, and K3 according to the following equation (1).

$$K = K1 \times K2 \times K3 \quad (1)$$

Note that K: degree of motion blur;
K1: first degree of motion blur;
K2: second degree of motion blur; and
K3: third degree of motion blur.

Next, the analysis performance means 20 obtains the width L of a blur in the image D. Here, the average edge width in the direction of the blur may be obtained as the width L of the blur regardless of the degree K of the motion blur. However, in the present embodiment, an average edge width for all of the eight directions illustrated in FIG. 6 is obtained as the width L of the blur.

The analysis performance means 20 outputs the degree N of the blur, the direction of the blur, the degree K of the motion blur, and the width L of the blur of the image D as blur information Q to the correction means 70 and the checking image extraction means 120. The analysis performance means 20 also outputs the coordinate positions of the edges other than the invalid edges removed by the edge limitation means 14 to the checking image extraction means 120 in addition to the blur information Q. The analysis performance means 20 also outputs the characteristic value S of the edge obtained by the edge characteristic obtainment means 16 to the checking image extraction means 120.

FIG. 12 is a block diagram illustrating the configuration of the checking image extraction means 120 in the image processing apparatus according to the embodiment illustrated in FIG. 4. As illustrated in FIG. 12, the checking image extraction means 120 includes a control means 122, a first edge number calculation means 124, a second edge number calculation means 126, and a region extraction means 128.

The control means 122 controls processing as to whether edge number calculation processing is performed by the first edge number calculation means 124 or the second edge number calculation means 126. The control means 122 controls processing based on the degree N of the blur, included in the blur information Q output from the blur analysis means 50. Specifically, if the degree N of the blur in the image D is less than or equal to a predetermined threshold value, the control means 122 causes the first edge number calculation means 124 to perform edge number calculation processing. If the degree N of the blur of the image D is higher than the predetermined threshold value, the control means 122 causes the second edge number calculation means 126 to perform edge number calculation processing. Here, operations by the first edge number accumulation means 124 and the second edge number accumulation means 126 will be described.

The first edge number calculation means 124 calculates the number of edges for each region of the image D, which has a size corresponding to a half of the resolution (L1×L2, for example) of the monitor 140. In other words, the region is a region of (L1/2) pixels×(L2/2) pixels. The first edge number calculation means 124 calculates the number of edges based on the coordinate positions of the edges other than the invalid edges which were removed by the edge limitation means 14. The first edge number calculation means 124 outputs the number of edges to the region extraction means 128.

The second edge number calculation means 126 calculates the number of edges which have the widths wider than or equal to the width L of the blur for each region of the image D, which has a size corresponding to a half of the resolution of the monitor 140. The second edge number calculation means 126 calculates the number of edges based on the coordinate positions of the edges other than the invalid edges which were removed by the edge limitation means 14, the width of each edge included in the characteristic value S of the edge, and the width L of the blur included in the blur information Q, which were output from the blur analysis means 50. The second edge number calculation means 126 outputs the number of edges to the region extraction means 128.

The region extraction means 128 extracts an image of a region which a largest number of edges based on the number of edges in each region, output from the first edge number calculation means 124 and the second edge number calculation means 126. The region extraction means 128 also enlarges the extracted image twice with respect to both vertical and horizontal directions (L1 pixels×L2 pixels) to obtain a checking image. Then, the region extraction means 128 outputs the checking image to the monitor 140.

The monitor 140 displays the checking image obtained by the checking image extraction means 120. As described above, the checking image displayed on the monitor 140 is an image of a region which has a largest number of edges in the image D (if the degree N of the blur in the image D is lower than or equal to a predetermined threshold value). The checking image displayed on the monitor is an image of a region which has a largest number of edges of which the widths are wider than width L of the blur in the image D (if the degree N of the blur of the image D is larger than the predetermined threshold value). Further, since the checking image is not a reduced image, the users can accurately check the condition of the blur in the image D even if the checking is displayed on a small monitor.

The users can input instructions to delete images which have extremely large blurs, instructions to store images in which no blur is present or only a small blur is present without performing correction processing on the images, or instructions to correct blurs at the input means 60 while looking at the checking images displayed on the monitor 140. The correction means 70 performs processing for deleting the image D from the storage means 10, storing the image D in the storage means 10 without performing correction processing on the image D, or storing the image D in the storage means 10 after performing correction processing on the image D based on the instructions input by the users at the input means 60. Here, an operation by the correction means 70 in a case where the users have input instructions to perform correction processing on the image D at the input means 60.

When the correction means 70 performs blur correction processing on the image D, first, the correction means 70 sets a linear correction parameter W1 for directional correction and a two-dimensional correction parameter W2 for isotropic correction according to the following equations (2):

$$W1 = N \times K \times M1$$

$$W2 = N \times (1-K) \times M2 \qquad (2)$$

Note that W1: linear correction parameter;
W2: two-dimensional correction parameter;
N: degree of blur;
K: degree of motion blur;
M1: linear correction mask; and
M2: two-dimensional correction mask.

Specifically, the correction means 70 sets the correction parameters W1 and W2 (a set of the correction parameters W1 and W2 is referred to as a parameter E) so that the magnitude of isotropic correction and the magnitude of directional correction become higher as the degree N of the blur is higher. Further, the correction parameters are set so that more weight is given to the directional correction as the degree K of the motion blur becomes higher.

Next, the correction means 70 corrects the blur in the image D by emphasizing high frequency components in the image D. Specifically, the region correction means 70 separates the high frequency components (referred to as high frequency components Dh) from the image D. The region correction means 70 corrects the blur in the image D by emphasizing the high frequency components Dh using the correction parameter E according to the following equation (3):

$$D' = D + E \times Dh \qquad (3)$$

Note that D': corrected image;
D: image before correction;
Dh: high frequency component of the image D; and
D: correction parameter.

If the users input instructions to perform correction processing at the input means 60, the correction means 70 performs correction processing on the image D as described above to obtain a corrected image D'. Then, the correction means 70 stores the corrected image D' in the storage means 10.

According to the image processing apparatus in the present embodiment as described above, the same effects achieved by the digital camera in the embodiment illustrated in FIG. 1 can be achieved. Further, when the degree N of the blur in the image D is low, in other words, if the image D is blurred only slightly, an image of a region having a largest number of edges is extracted as a checking image. If the degree N of the blur in the image D is high, in other words, if the image D is severely blurred, an image of a region which has a largest number of edges of which the widths are wider than or equal to the width L of the blur in the image D is extracted as the checking image. Since the checking image which is appropriate for checking the condition of the blur is extracted based on the degree of the blur in the image D, the users can accurately check the condition of the blurs.

Further, in a display device which has high resolution such as VGA (Video Graphics Array), if an image which has the same size as the resolution of the display device is extracted from the image, and displayed on the display device, the condition of the blurs may not be checked correctly. That is because since the size of the checking image is large, there are regions in which edges are concentrated, and regions in which edges are not concentrated in the checking image. Therefore, in the image processing apparatus according to the present embodiment, an image which has a size smaller than the resolution of the monitor, which is a display device, is extracted, and the extracted image is enlarged so that the size of the enlarged image becomes the same as the resolution of the monitor. Accordingly, even if the resolution of the display device is high, the users can accurately check the condition of the blurs. Further, in this case, it is also possible that the extracted image is not enlarged to the same size as the resolution of the display device. The extracted image may be displayed without changing the size. Alternatively, the extracted image may be displayed on a part of a display screen of the display device by enlarging the image to a size which is less than the resolution of the display device.

As described above, the advantages of the image processing method according to the present invention are not limited to checking the condition of blurs in a large image using a display device having small resolution. The image processing method according to the present invention may be also effectively applied to processing for checking the condition of blurs in an image using a display device having high resolution.

So far, preferred embodiments of the present invention have been described. However, the image processing method, apparatus, and program of the present invention are not limited to the embodiments as described above. Various additions, reductions, or modifications can be made without deviating from the spirit of the present invention.

For example, in the image processing apparatus according to the second embodiment of the present invention, as illustrated in FIG. 4, the width of the blur is obtained by analyzing the image D. However, as in the blur correction method disclosed in Japanese Unexamined Patent Publication No. 2002-112099, an apparatus (for example, an acceleration sensor) which can obtain information such as the direction of the motion blur or the width of the motion blur during photography may be installed in the photography apparatus. The width of the blur (a motion blur in this case) obtained during photography may be used.

Further, the blur correction method is not limited to the method performed by the image processing apparatus in the embodiment illustrated in FIG. 4. The blur may be correcting by using a method as disclosed in Japanese Unexamined Patent Publication No. 7(1995)-121703, for example. In this method, a deterioration function is set with respect to a blurred image, and the blurred image is corrected by applying a restoration filter corresponding to the set deterioration function. Then, the corrected image is evaluated, and a deterioration function is set again based on the result of evaluation. Blur correction may be performed by repeating correction processing, evaluation processing, and resetting of the deterioration function until an image of desired quality is obtained.

Further, the method for extracting edges, the method for extracting images, the method for analyzing the blurs in the image, and the method for correcting the blurs based on the result of analysis are not limited to the methods performed by the image processing apparatus in the embodiments as described above.

What is claimed is:

1. An image processing method comprising the steps of:
   extracting an image of a region in which a blur tends to clearly appear from a digital photograph image as a blur checking regional image; and
   displaying the extracted blur checking regional image in a size appropriate for the resolution of a display device.

2. The image processing method as defined in claim 1, further comprising the steps of:
   extracting edges from the digital photograph image;
   obtaining the number of the extracted edges for each of a plurality of regional images having the same size, which are formed by dividing the digital photograph image into blocks; and
   extracting a regional image which has a largest number of the edges as the blur checking regional image.

3. The image processing method as defined in claim 1, further comprising the steps of:
   extracting edges from the digital photograph image;
   obtaining the width of a blur in the digital photograph image;
   obtaining the number of edges which have the width wider than or equal to that of the blur for each of a plurality of regional images having the same size, which are formed by dividing the digital photograph image into blocks; and
   extracting a regional image which has a largest number of the edges as the blur checking regional image.

4. The image processing method as defined in claim 2, wherein the size of the regional image is determined based on the resolution of the display device.

5. The image processing method as defined in claim 3, wherein the size of the regional image is determined based on the resolution of the display device.

6. An image processing apparatus comprising:
   a blur checking regional image extraction means for extracting an image of a region in which a blur tends to clearly appear from a digital photograph image as a blur checking regional image; and
   a display means for displaying the extracted blur checking regional image in a size appropriate for the resolution of a display device.

7. The image processing apparatus as defined in claim 6, wherein the blur checking regional image extraction means includes an edge extraction means for extracting edges from the digital photograph image, an edge number calculation means for obtaining the number of the extracted edges for each of a plurality of regional images having the same size, which are formed by dividing the digital photograph image into blocks, and an extraction means for extracting a regional image which has a largest number of the edges as the blur checking regional image.

8. The image processing apparatus as defined in claim 6, wherein the blur checking regional image extraction means includes an edge extraction means for extracting edges from the digital photograph image, a blur width calculation means for obtaining the width of a blur in the digital photograph image, an edge number calculation means for obtaining the number of edges which have the width wider than or equal to that of the blur for each of a plurality of regional images having the same size, which are formed by dividing the digital photograph image into blocks, and an extraction means for extracting a regional image which has a largest number of the edges as the blur checking regional image.

9. The image processing apparatus as defined in claim 7, wherein the size of the regional image is determined based on the resolution of the display device.

10. The image processing apparatus as defined in claim 8, wherein the size of the regional image is determined based on the resolution of the display device.

11. A computer-readable medium having data representing a program for causing a computer to execute an image processing method, the program comprising the procedures for:

extracting an image of a region in which a blur tends to clearly appear from a digital photograph image as a blur checking regional image; and displaying the extracted blur checking regional image in a size appropriate for the resolution of a display device.

12. The computer-readable medium as defined in claim 11, wherein the procedure for extracting the image as the blur checking regional image includes a procedure for extracting edges from the digital photograph image, a procedure for obtaining the number of the extracted edges for each of a plurality of regional images having the same size, which are formed by dividing the digital photograph image into blocks, and a procedure for extracting a regional image which has a largest number of the edges as the blur checking regional image.

13. The computer-readable medium defined in claim 11, wherein the procedure for extracting the image as the blur checking regional image includes a procedure for extracting edges from the digital photograph image, a procedure for obtaining the width of a blur in the digital photograph image, a procedure for obtaining the number of edges which have the width wider than or equal to that of the blur for each of a plurality of regional images having the same size, which are formed by dividing the digital photograph image into blocks, and a procedure for extracting a regional image which has a largest number of the edges as the blur checking regional image.

14. The computer-readable medium as defined in claim 12, wherein the size of the regional image is determined based on the resolution of the display device.

15. The computer-readable medium as defined in claim 13, wherein the size of the regional image is determined based on the resolution of the display device.

* * * * *